United States Patent Office 3,199,864
Patented Aug. 10, 1965

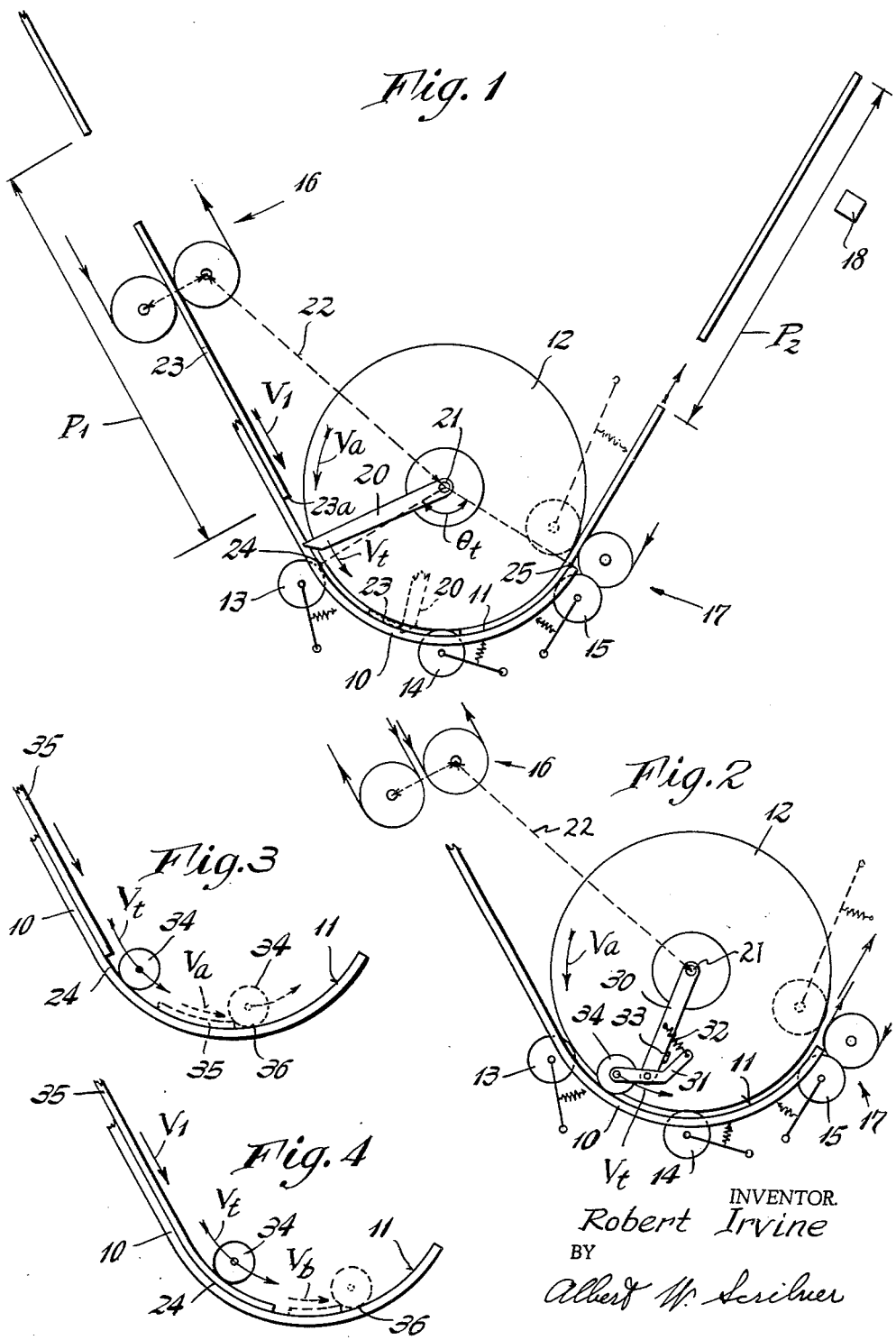

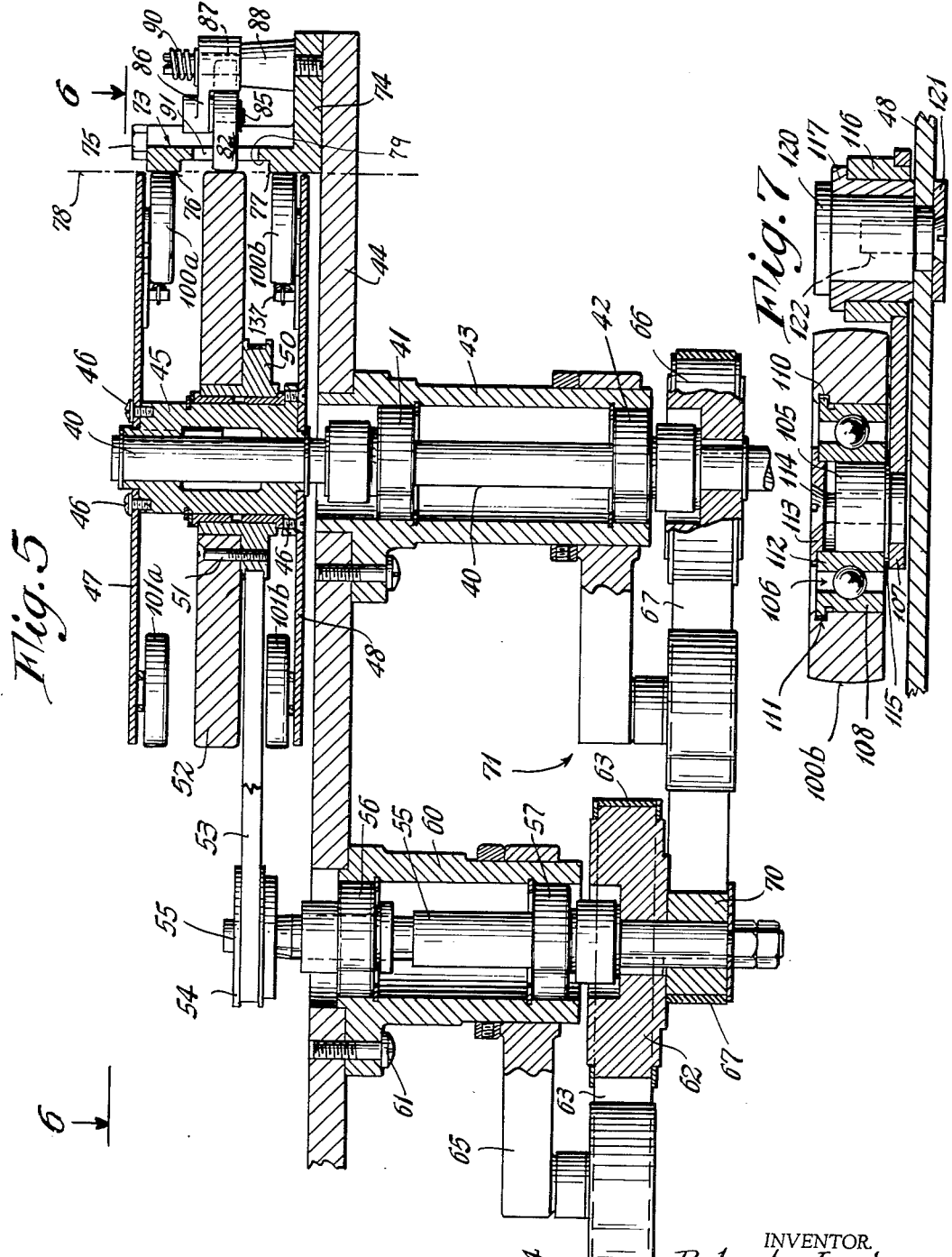

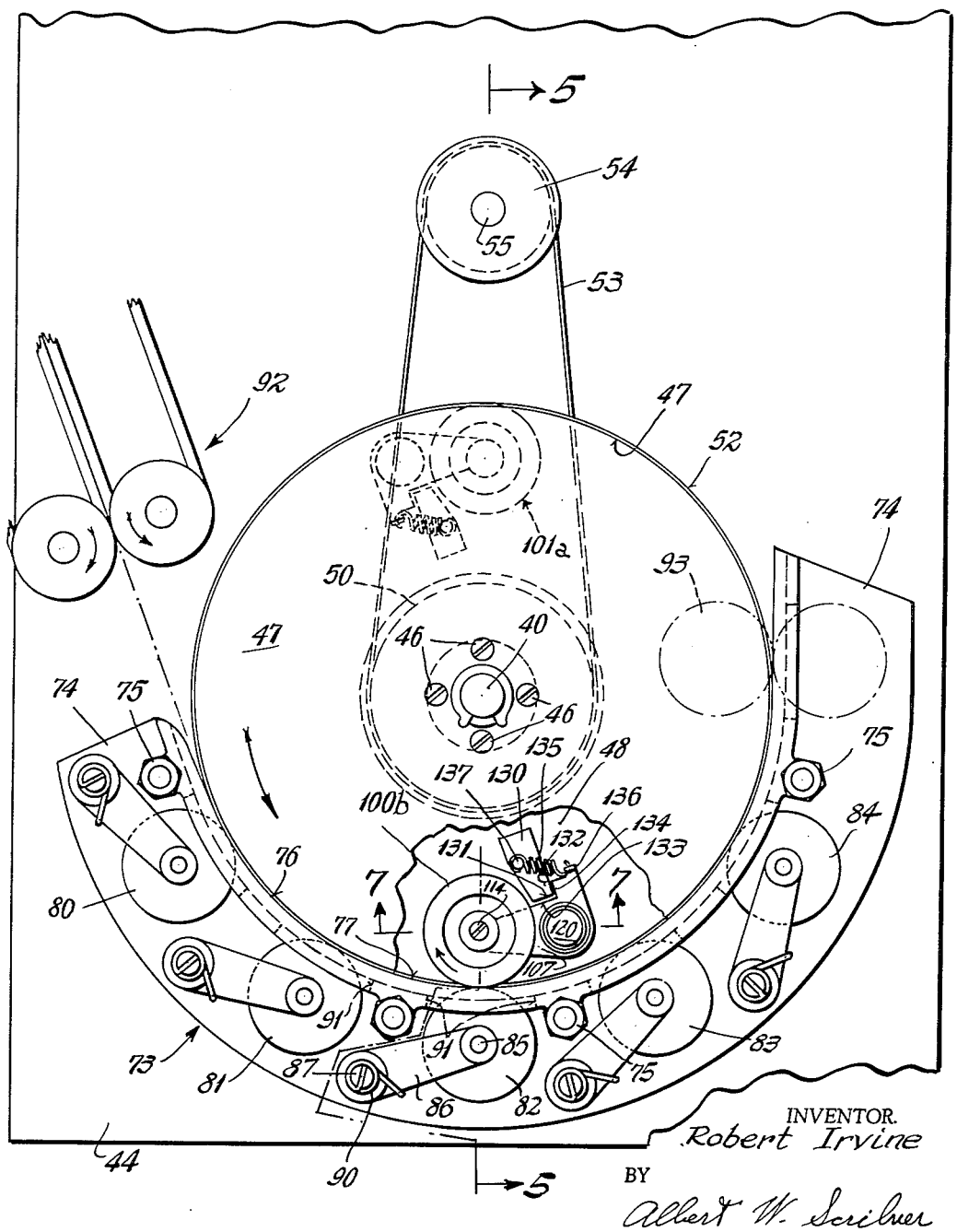

3,199,864
DOCUMENT HANDLING APPARATUS
Robert Irvine, Riverside, Conn., assignor to Pitney-Bowes, Inc., Stamford, Conn., a corporation of Delaware
Filed Feb. 21, 1963, Ser. No. 260,265
14 Claims. (Cl. 271—51)

This invention relates to a novel document or work sheet handling apparatus. More particularly the invention relates to an improved apparatus for synchronizing the movement of a plurality of documents so that a predetermined spaced relation exists between successive documents.

In many data processing installations documents are required to be successively transported at high speeds along a predetermined feed path. In this type of arrangement there frequently arises a need for synchronizing the feed motion of said documents i.e. for placing each moving work sheet in a particular positional relation with respect to an adjacent work sheet. Obtaining this synchronization or mutual positional relationship between the documents while the latter are in motion has heretofore presented some severe problems particularly in those applications where the piece rate of document feed is in the order of 1000 documents per minute or higher. Prior attempts, such as illustrated in U.S. Patents 2,973,202 and 2,977,114, to control the positional relation of each spaced work sheet in a document train have been directed toward providing a document timing or restraining member which cyclically moves at a predetermined speed along a synchronizing portion of a feed path and which cooperates with a yieldable document drive means that normally tends to drive a document along said path at a speed higher than said predetermined speed whereby each successive work sheet is yieldably brought to and retained in engagement with said feed restraining member during the synchronizing motion of the latter. In this way the motion of the successive documents in being brought into a known phase relationship with respect to a single known cyclic motion will be thereby brought into known phase relation with each other. One specific difficulty which is usually encountered in using this synchronizing technique is that the restraining member must always get into and move along the synchronizing portion of the feed path ahead of a document to be synchronized. If by chance the document arrives at said timing portion of the feed path early, i.e. before the restraining member, then said member will physically perforate or otherwise damage the early work sheet and in so doing may cause a subsequent jam-up of the damaged document and/or other documents in the feed guideways. Because of the possibility of this type of malfunction it has been necessary to initially time the feeding of each successive document to the synchronizing portion of the feed path so that each document is always a little late with respect to the movement of the restraining member, and then to accelerate the document into trailing engagement with said restraining or timing member. This late-timing prerequisite greatly restricts the function tolerances permissible in the operational timing of the document delivery means not only because a document can never be early in arriving at the synchronizing portion of the feed path but also because the maximum allowable degree of lateness is limited.

The primary object of the instant invention is to provide a novel construction and arrangement for a document synchronizing means whereby not only may a document arriving late at said station be driven at speeds greater than the synchronized speed until a desired synchronized condition is reached as in the prior art but also a document arriving early at said station may be properly retarded to speeds below the synchronized speed until the desired synchronized condition is reached.

Another object of the invention is to provide a novel document feeding apparatus whereby each document in a stream of serially fed documents may be positionally adjusted in either endwise direction relative to an adjacent document so that the initial spacing between predetermined portions of the successive documents may be increased or decreased as needed in order to obtain a desired document feed timing.

Another object of the invention is to provide a novel document synchronizing apparatus whereby a bi-directional document phase shifting control is obtained by the simultaneous application of frictional drive and braking forces which automatically tend to become balanced and which in doing so bring a document to a desired phase adjusted condition.

Another object of the invention is to provide an improved apparatus for establishing a uniform phase relation between the leading edges of a series of moving documents whereby any document that is initially ahead of phase with respect to the next preceding document may be yieldably braked to just the extent necessary to bring it back into the proper phase position, and also whereby any document which is initially behind in phase with respect to the next preceding document may be frictionally accelerated to just the extent necessary to bring it up into said proper phase position.

Still another object of the invention is to provide a novel apparatus for temporarily retarding documents that have been fed to a timing station early with respect to a desired timing, said documents being retarded to speeds below the desired synchronized speed until a desired mutual phase positionment of the respective documents has been established.

Other objects of the invention will become apparent as the disclosure progresses.

FIG. 1 is a diagrammatic sketch illustrating the document timing technique utilized in prior art document feed devices.

FIGS. 2–4 are diagrammatic sketches illustrating the document timing technique utilized in the instant apparatus.

FIG. 5 is an elevational view in partial section taken along section line 5—5 of FIG. 6.

FIG. 6 is a plan view of one embodiment of the instant invention.

FIG. 7 is an elevational view in partial section taken along section line 7—7 of FIG. 6.

The operational concepts of the prior art and the instant invention will be discussed first in connection with FIGS. 1–4, and thereafter a specific structural embodiment of the invention will be described in connection with FIGS. 5–7. It will be understood that the sizes and relative proportions of some of the elements diagrammatically illustrated in FIGS. 1–4 are purposely exaggerated for the purpose of clarity in the explanation of the functional nature of the document feed timing apparatus.

Referring to FIG. 1 there is illustrated a conventional type document timing technique which has been used in prior art machines. Here the synchronizing means is adapted to receive a train of documents wherein a non-uniform pitch $P_1$ exists between the leading edges of the documents and to establish a uniform pitch $P_2$ between the leading edges of said documents that are discharged from said synchronizing means. A stationary guide member 10 is provided with a smooth inner guide surface 11 that effectively defines a predetermined arcuate document synchronizing or timing feed path that extends around a circular portion $\theta_t$ of the periphery of an accelerator wheel 12 that is adapted to be rotatably driven at a high rate of speed. The guide member 10 is formed with suitable apertures through which extend guide rolls such as 13, 14 and 15 that are mounted so as to be normally biased into engagement with the periphery of wheel 12. A document separating and feeding means illustrated generally at 16 operates to serially feed documents at a feed speed $V_1$ into the said arcuate feed path whereupon the rotating wheel 12 in cooperation with rolls 13–15 takes over the driving of the documents along said timing feed path and feeds said documents into an output transport means generally illustrated at 17. The output means 17 is adapted to transport successive documents to a predetermined downstream point such as a document reading station 18. In that it is desired to have the documents move into the output transport means 17 in uniform timed relation a synchronizing means is provided which is capable of placing the leading edges of successive documents in predetermined phase relation as said documents move over said timing feed path. This synchronizing means includes a timing paddle or governor member 20 which is mounted for independent rotational movement about an axis 21 that is coincident with the rotational axis of wheel 12. The effective peripheral speed $V_t$ of paddle 20 is uniform and corresponds to the desired timing of delivery of documents to said output transport means 17. The effective peripheral speed $V_a$ of the accelerator wheel 12 is the same as or slightly greater than $V_1$ and is greater than said paddle speed $V_t$. The drive means for the timing paddle 20 and the input feed means 16 are interconnected, as is diagrammatically illustrated at 22, so that a document such as 23 may be introduced into the timing feed path in timed relation to the swinging motion of said paddle 20. This timed relation is such that the paddle always reaches the beginning point 24 of the said timing feed path just before the leading edge 23a of the next document to be timed. When the leading edge 23a passes point 24 the document in moving between the friction wheel 12 and the rolls 13–15 will be frictionally driven by the wheel 12 at a speed $V_a$ which is greater than the paddle speed $V_t$ and hence the document will immediately catch up to and engage the trailing edge of said paddle as indicated by the dotted lines 20 and 23 of FIG. 1. Thereafter the document motion follows the motion of the paddle while experiencing some frictional slippage with respect to the wheel 12 until at the exit end 25 of the timing feed path said leading edge is permitted to move tangentially into said output transport means 17. Thus as each successive document 23 moves along said timing feed path its leading edge will become synchronized with the motion of the paddle 20 and will enter the output transport means 17 with a uniform speed and a uniform phase relation with respect to the paddle 20 and to the next prior synchronized document. It is imperative that the paddle 20 arrive at the beginning point 24 of the timing feed path early i.e. before the leading edge of the next document in that if it arrived late then the paddle would obviously pierce or otherwise seriously damage the document. Thus in this conventional type arrangement the input feed means 16 must always feed a document late and never early with respect to the timing paddle 20 and as a result the functional tolerances permissible in the operation of feed means 16 are far more limited than they might be if the paddle 20 could properly synchronize a document that arrived at the timing feed path starting point 24 early as well as late.

The instant invention is directed toward providing such a synchronizing means which is disposed along the document feed path and which is capable of synchronizing and positionally adjusting a given document whether or not said given document is initially early or late with respect to the movement of the synchronizing means. A functional explanation of the instant inventive concept will be made with reference to FIGS. 2–4 wherein those elements having the same functions as the corresponding elements in FIG. 1 have the same reference numerals as said FIG. 1 elements respectively. In FIG. 2 in place of a paddle such as 20 of FIG. 1 there is provided a synchronizing arm 30 which is mounted for rotation about axis 21 and which has a lever 31 pivotally secured to the outer end thereof. Lever 31 is rotatably biased by a spring 32 toward a position limiting stop 33 on arm 30. The outer end of lever 31 rotatably supports a timing or register roll 34 that is adapted to be yieldably biased against and to roll over the stationary guide surface 11 during the swinging motion of the arm 30. The effective planetary or orbital speed $V_t$ of roll 34 corresponds to the swinging speed $V_t$ of paddle 20 in FIG. 1. The operation of the FIG. 2 type of arrangement is illustrated in FIGS. 3 and 4. If a document 35 is fed so as to arrive at the beginning point 24 of the timing feed path after the roll 34, as illustrated in FIG. 3, then the accelerator wheel 12 will frictionally drive or accelerate the document as indicated by arrow $V_a$ so that the leading edge of said document immediately catches up to and moves into trailing engagement with that peripheral portion of the roll periphery just behind the roll contact point 36 as illustrated by the dotted lines of FIG. 3. Thereafter the document will closely follow the roll movement along the guide surface 11 and thus will become synchronized with the planetary motion of said roll which has a substantially uniform orbital speed corresponding to that desired for the synchronized document motion. During its synchronized roll trailing movement the leading edge of the document is continually urged into a wedged position between the guide surface 11 and the said roll periphery. Here the drive action of accelerator wheel 12 will not advance the leading edge of the document under the roll contact point 36 to any significant extent in that any tendency to do so will simply cause the roll to thereby bias the document against the stationary guide surface 11 which will cause the document to be frictionally braked to an effective value below $V_t$ whereupon the roll 34 will move ahead relative to the document and will roll off said leading edge to again resume the positional relation indicated by said dotted lines of FIG. 3. Thus the roll contact point 36 always tends to frictionally hold the leading edge of the document back even though said leading edge is urged into wedged engagement between the surface 11 and roll 34 by the continuous driving action of the accelerated wheel 12. Here then the document will always seek that synchronized trailing position relative to the roll wherein the frictional driving forces will just balance the frictional braking forces applied thereto.

If the document 35 arrives at point 24 early, i.e. before the roll 34 as illustrated in FIG. 4 then the roll will engage the adjacent face of the document and will thereby immediately bias the opposite face of the document into frictional braking engagement with the stationary guide surface 11 and the document speed will be reduced to a value $V_b$ that is less than the desired timing speed $V_t$. The roll 34 will then roll ahead toward the leading edge of the document all the while continually causing said document to be frictionally braked by surface 11 until such time as it rolls off the leading edge of the slowed document whereupon the yieldable braking action ceases and the frictional accelerating action of the higher speed accelerator wheel 12, FIG. 2, will thereafter keep the leading edge of the now synchronized document right at the heel of the rolling contact point 36 of the roller as illustrated by the dotted lines in FIG. 4. The frictional braking action created by baising the document against the stationary guide surface 11 is supplemented by a dynamic frictional braking action exerted by the periphery of the rotating roll 34. Roll 34 will be rotating about its own axis when it arrives at the beginning point 24 of the feed path, this rotation existing by reason of the rotational inertia possessed by the roll as it completed its previous run over the guide surface 11. The rotation of the roll periphery will upon roll engagement with the face of the early document frictionally apply a reverse driving force to the document and such will tend to retard the forward movement of the document. The inertial rotation of the roll will tend to cause an overrunning or skidding of the roll periphery on the document face and such will continue until the roll moves off and ahead of the leading edge of the document as above described. Thereafter the synchronized document trailing condition described in connection with FIG. 3, it will prevail throughout the remaining portion of the timing feed motion of roll 34 whereupon said document enters the output transport means 17 in a desired synchronized condition.

By being capable of applying frictional accelerating forces and intermittent larger retarding forces to each document that passes over the timing feed path the position of each document may be bi-directionally adjusted with respect to the synchronizing roll 34, and in this way the successive documents can be delivered to the output feed means 17 in a desired timed sequence such that the leading edges of successive documents are spaced a substantially uniform distance apart. In that the phase shifting capability of the technique illustrated in FIGS. 2–4 is bi-directional the timing tolerances permissible in the operation of the document input feed means 16 are greatly eased, i.e. a relatively wide variation in the operational timing of the feeding means 16 will be accommodated by the instant roll type synchronizing means in that the latter can handle documents which arrive at the feed path early as well as late with respect to the motion of said synchronizing roll 34.

Referring to FIGS. 5–7 a description will now be made of one particular structural embodiment of the invention. A main shaft 40 is rotatably supported by a pair of spaced bearings 41 and 42 that are mounted in a cylindrical housing 43 fixed to a stationary machine frame plate 44. Fixed to the upper end of shaft 40 is a hub collar 45 to which is secured as by screws 46 a pair of axially spaced discs 47 and 48. Rotatably mounted on the hub collar is a pulley 50 to which is coaxially fixed as by screws such as 51 an accelerator wheel 52, the wheel having a radius slightly greater than the discs 47, 48. Separate but interrelated drive means are provided for rotatably actuating the accelerator wheel 52 and the two timing discs 47, 48. The drive means for the accelerator wheel comprises a belt 53 that extends around said pulley 50 and a cooperating pulley 54 that is secured to the upper end of a shaft 55. Shaft 55 is rotatably supported by means of bearings 56 and 57 mounted in a cylindrical housing 60 that is fixed to said frame plate 44 by means of screws such as 61. Rotatably secured to the lower portion of shaft 55 is a pulley 62 that is adapted to be driven by a belt 63 that in turn is driven by any suitable power means such as an electric motor not shown. Any suitable belt tightening means may be used here; for example an idler pulley 64 may be provided on which the belt 63 may run and which is rotatably supported by an arm 65 that is adjustably pivotally secured by any suitable clamping means to the cylindrical housing 60. The arm 65 is pivotally positioned and secured so that the idler pulley 64 maintains the belt 63 in an operatively tightened condition.

The drive means for the discs 47 and 48 comprises a pulley 66 which is fixed to the lower portion of the main shaft 40 and around which extends a belt 67. The belt 67 also extends around a pulley 70 that is secured to the lower portion of said shaft 55. Any suitable belt tightening means 71 may also be used here, said means being similar to that provided for belt 63. As will be apparent when the shaft 55 is power driven by the pulley 62 and belt 63 the accelerator wheel 52 and the discs 47, 48 will be rotatably driven in timed relation; the effective rotative speed of the wheel 52 being greater than that for the discs 47, 48.

Cooperating with the accelerator wheel and the discs is a document guide means 73 that comprises a guide member 75 which is releasably secured to said frame plate 44 by any suitable fastening means such as bolts 75 and which is formed with vertically coextensive inner cylindrical document guide surfaces 76 and 77, FIG. 5. Surfaces 76 and 77 are formed and positioned so as to be substantially concentric and coextensive with the adjacent peripheral portion of the wheel 52 as is diagrammatically illustrated by the feed path plane line 78; the guide surfaces 76 and 77 and the adjacent portion of the periphery of accelerator wheel 52 defining a timing feed path for the documents. The guide member 74 is formed with an annular groove or recess 79 between the axially spaced arcuate guide surfaces 76 and 77, said recess being disposed opposite the periphery of the wheel 52. Mounted on the guide member 74 for cooperation with the periphery of the accelerator wheel 52 is a set of bogie wheels 80–84 inclusive. In that the construction, support and operation for each of the bogie wheels is similar a detailed explanation of just one thereof will suffice here. The bogie wheel 82 is rotatably mounted on a stud shaft 85 fixed to an arm 86 that is pivotally supported on the upper necked shaft portion 87 of an upstanding stud 88. The lower end of stud 88 is threadedly fixed to the outer flange portion of the guide member 74. A torsion spring 90 operatively disposed between the said shaft portion 87 and the arm 86 serves to pivotally bias the latter so that the bogie wheel 82 is yieldably urged into peripheral contact with the accelerator wheel 52 as illustrated in FIG. 5, the bogie wheel extending through a suitable slot 91 formed in the guide member 74.

A document delivery means 92 is provided for serially delivering documents to the arcuate guide surfaces 76 and 77, said delivery means being of any suitable type and being operated in the usual timed relation with respect to the operation of the synchronizing discs 47 and 48. As will be apparent when the leading edge of a document is fed by means 92 between the first bogie wheel 80 and the periphery of the accelerator disc 52 the document will thereafter be frictionally driven along said timing feed path to the output transport means illustratively shown by dot-dash lines 93 of FIG. 6.

Synchronizing means are provided in the instant apparatus for yieldably retarding a document that is being yieldably driven along the timing feed path, such means including a first pair of vertically aligned register rolls 100a and 100b and a diametrically opposed second pair of vertically aligned register rolls 101a and 101b that are mounted on the peripheral portions of said timing discs 47 and 48. The upper register rolls 100a and 101a are mounted on the lower side of disc 47 and are adapted to cooperate with the upper guide surface 76 while the lower register rolls 100b and 101b are mounted on the upper side of disc 48 and are adapted to cooperate with the guide surface 77. In that the construction, support and operation for each one of these four register rolls is similar a detailed explanation of one thereof will suffice here. The register roll 100b is rotatably mounted on a pivot pin 105, FIG. 7, by any suitable means such as a ball bearing 106, the pivot pin 105 being welded or otherwise fixed to the outer end of a lever arm 107. The ball bearing 106 may be of a conventional type having an outer ring 108 which is formed with an annular projection 110 and which is snapped into an inner annular groove 111 formed in the roll. The inner bearing ring 112 is retained on pin 105 by a washer 113 and a screw 114, the latter being threaded into the end of pin 105. A washer 115 is provided for maintaining the lower face of the bogie wheel 100b spaced from the adjacent upper surface of the lever arm 107. Fixed to the lever arm 107 is a hub 116 which is rotatably mounted on a tubular stud 117 that is fixed on the upper surface of the timing disc 48 by means of a stud 120, the latter being retained on said disc 48 by means of the washer 121 and the screw 122 that is threaded into the lower end of stud 120. A lever arm stop 130, FIG. 6, is fixed to the upper surface of lower disc 48 by any suitable means such as rivets and is formed with two abutment surfaces 131 and 132 which are adapted to respectively cooperate with abutment surfaces 133 and 134 formed on lever arm 107 so as to permit only a relatively short arcuate displacement of arm 107. The lever arm together with the register roll 100b is biased toward a normal counterclockwise position determined by engagement of abutment surfaces 132 and 134 by means of a tension spring 135 that is connected between an upstanding tab 136 formed on lever arm 107 and a stud 137 fixed to said stop 130. The essentially radially outward biasing force effectively exerted on roll 100b by the spring 135 is operationally assisted by the action of the centrifugal force experienced by the roll as the latter is orbitally translated by the rotating timing disc 48. The register wheel 100b during a portion of its orbital movement is adapted to roll over the guide surface 77 and when so doing the lever arm 107 is approximately in the center of its permissible arcuate displacement. When the rolling register roll 100b swings out of engagement with said surface 77 the lever arm 107 will immediately swing a very short distance to its said counterclockwise position relative to disc 48 as determined by engagement of the abutment surfaces 132 and 134. During the period that the orbiting roll 100b is out of engagement with said surface 77 the rotational inertia of the roll will cause the latter to continue rotating about its own geometric axis. When the roll again reengages the guide surface 77 at the beginning of the timing feed path it will be cammed radially inward to a slight extent so that the lever arm 107 will be pivoted in a clockwise direction, the abutment surfaces 131 and 133 insuring that no excessive clockwise bounce or over-travel of lever arm 107 takes place when said camming action of the roll occurs very rapidly.

The two register rolls 100a and 100b, FIG. 5, are effectively displaced 180 degrees from the other register rolls 101a and 101b so that two successive documents may be synchronized for each revolution of the main shaft 40 and the timing discs 47 and 48. The effective speed of rotation of discs 47 and 48 will determine the synchronized speed and frequency at which the documents leave the timing feed path, the timing feed path here being defined by that arcuate length of surfaces 76 and 77 along which the register rolls may roll. For a consideration of the operational dynamics of the register rolls reference may again be made to the diagrammatic sketches of FIGS. 2–4 and to the related discussion thereof. It will be evident that various numbers of spaced register rolls or sets of rolls may be provided on the periphery of discs 47 and/or 48; the cyclic operation of the document delivery means 92 here being appropriately timed to the frequency at which said rolls or sets of rolls swing by said timing feed path.

As may be readily seen a great and disproportionate improvement in synchronizing capability is achieved here by making a few relatively simple structural changes in the combination. The instant document synchronizing technique and apparatus has been successfully used to efficiently bi-directionally adjust the phase conditions of documents that are being serially fed through the synchronizing feed path at a rate of 25 pieces per second.

Since many changes could be made in the embodiment of the invention as particularly described and shown herein without departing from the scope of the invention, it is intended that this embodiment be considered as exemplary and that the invention not be limited except as warranted by the following claims.

What is claimed is:

1. Apparatus for adjusting the phase relation of each of a series of moving documents: comprising
    means establishing a predetermined document synchronizing feed path;
    document feed means for imparting a frictional driving force to each of a plurality of successive documents so as to yieldably move each document along said synchronizing feed path;
    braking means when operable to temporarily frictionally retard a document moving along said synchronizing feed path to a speed below the synchronized feed speed;
    timing means controlling the operation of said braking means whereby each document moving along said path may experience a phase adjusting movement in either endwise direction relative to an adjacent document so that the extent of the initial spacings between predetermined portions of the successive documents may be respectively increased or decreased as needed in order to obtain a desired sequential timing of the documents leaving said synchronizing feed path; and
    drive means for operating said timing means.

2. Apparatus as defined by claim 1 wherein the feed path establishing means includes a stationary document guide member having a friction surface formed thereon; and wherein said braking means includes a register roll which is mounted for translational movement into and out of cooperative document braking relation with respect to said friction surface.

3. A document feed synchonizing apparatus for temporarily delaying an early feed movement of a document until a predetermined desired phase positionment thereof is established and for thereafter controlling the synchronized speed of said document: comprising
    means establishing a synchronizing feed path;
    document drive means for urging a document along said synchronizing feed path;
    document retarding means for retarding the movement of said document along said synchronizing feed path to a speed below the said synchronized speed; and
    timing means for operating said retarding means to retard a document that is delivered to said feed path early with respect to a desired synchronized timing and for controlling the operation of said document drive means after said retarding means has retarded said document long enough so that the latter is in a desired positional phase relation with respect to said retarding means.

4. In a document handling apparatus having means defining a predetermined document timing feed path, and delivery means for serially delivering documents to said feed path: the improvement comprising
    a first frictional force applying means adapted to frictionally engage and drive a document along said timing feed path;
    a second frictional force applying means adapted when operative to frictionally engage and retard a document that is moving along said feed path notwithstanding the driving action of said first force applying means; and
    timing means controlling said second frictional force applying means so as to be determinative of the synchronizing speed and mutual phase conditions desired for successive documents as the latter leave said feed path, said timing means being operable first to temporarily permit unrestrained operation of said first frictional force applying means when a document moving into said feed path is late with respect to the desired phase condition, and secondly to temporarily render said second frictional force applying means operable when a document having along said feed path is early with respect to the desired phase condition so as to temporarily slow said document down to a speed below the desired synchronized speed, the timing means thus serving to bring each successive document moving along said feed path to a timed condition corresponding to that for said timing means.

5. Apparatus for adjusting the spaced relation of successive documents that are serially transported along a feed path: comprising means establishing a predetermined document timing feed path;

document synchronizing means operable to determine the desired synchronized speed and mutual phase relation of successive documents leaving said timing path;

said synchronizing means including an accelerating member which is capable of feeding documents along said path at speeds higher than said desired synchronized speed;

said synchronizing means also including a document speed and phase control member operable to limit the driving action of said document accelerating member and in the case of an early fed document to temporarily reduce the document speed along said path to a value lower than said desired synchronized speed, the operation of said synchronizing means serving to bring the leading edge of each successive document into alignment with a predetermined portion of said speed and phase control member before said document leaves said timing path, and drive means for actuating said accelerating member and said phase control member.

6. Apparatus as defined by claim 5 wherein said accelerating member comprises a friction drive wheel; wherein said means for establishing said feed path includes a stationary guide member having a friction guide surface formed thereon; and wherein said speed and phase control member comprises a roll that is mounted for translation so as to roll over said friction guide surface at an effective translational speed that is less than the effective peripheral speed of said friction drive wheel.

7. In a document feed apparatus having transport means for serially feeding a plurality of documents along a predetermined feed path:

synchronizing means operable over a timing portion of said feed path to modify the feed movement of said documents so as to establish a predetermined desired speed of and phase relation between said documents;

said synchronizing means including a document driving member having a peripheral surface that is adapted to frictionally engage a surface of each document so as to be capable when permitted of continuously yieldably driving the latter along said feed path at speeds above said desired speed;

drive means for actuating said driving member;

said synchronizing means also including a register roll, and a friction guide member having a friction braking surface formed thereon that is disposed along said timing portion of said feed path, said roll being mounted for translational movement over a cooperating portion of said friction braking surface, the cooperation between said roll and friction braking surface serving to retard the driving action of said document driving member and in the case of an early document to temporarily decrease the speed of document travel to a value below the said desired speed condition;

said synchronizing means thus being capable of longitudinally advancing or retracting the position of a document relative to the outermost rolling contact point of said roll; and drive means for translating said roll at a speed corresponding to said predetermined desired speed.

8. Apparatus as defined by claim 7 wherein said driving member comprises a rotatably driven accelerator wheel; wherein said friction braking surface on said guide member is stationary and is arcuate in configuration; and wherein said roll is mounted for planetary movement over said stationary friction guide surface whereby a document that arrives at said surface before said roll is thereafter temporarily frictionally braked by being biased into said braking surface by the planetating roll and whereby a document that arrives at said surface after said planetating roller is speeded up into trailing engagement with the periphery of said roll by the high speed frictional drive action of the peripheral surfaces of said friction accelerator wheel, each successive document leaving said timing portion of said feed path thus having a predetermined uniform speed and mutual phase relation with respect to said roll and thus with respect to each other.

9. Apparatus as defined by claim 8: additionally comprising means for rotating said accelerator wheel at speeds effective greater than the effective translatory speed of said roll.

10. In an apparatus for adjusting to predetermined synchronized speed and phase relation the motion of each of a series of documents moving along a predetermined feed timing path:

a stationary guide member having a friction guide surface formed thereon which is disposed along one side of said feed timing path;

accelerator means capable of yieldably driving documents along said path at speeds above said predetermined synchronized speed;

drive means for said accelerator means;

a timing roll;

means mounting said timing roll on the other side of said feed timing path for translation through a predetermined cyclic path of travel such that during a portion of said travel said roll rolls over at least a portion of said friction guide surface so as to be thereby capable of biasing a moving document into frictional braking engagement with said guide surface so as to temporarily slow said document down to a speed that is below said predetermined synchonized speed;

said accelerator means and said roll serving to respectively yieldably drive and brake each document moving along said timing path so as to cause the leading edge of each document first to hunt for the rolling contact point of said roll as the latter rolls along said guide surface and thereafter to remain in persistent trailing engagement with that portion of the periphery of said roll that is located just behind said rolling contact point; and means for driving the roll mounting means at a lower effective speed than that of said document accelerator means whereby the cyclic rolling action of said roll over said braking surface limits the yieldable drive action of said accelerator means and is determinative of the speed and mutual phase relation of the documents leaving said feed timing path.

11. Apparatus as defined by claim 10 wherein said feed timing path is disposed along a circular arc; wherein said accelerator means includes a rotatably mounted and driven wheel which peripehally frictionally engages the documents substantially through their movement along said feed timing path, and wherein said roll mounting means imparts a planetary movement to said roll as the latter rolls over said friction guide surface; the axes of said circular arc, the acelerator wheel and the planetary movement of said roll being substantially coincident.

12. A document feed synchronizing apparatus: comprising a base;

a document guide means mounted on said base and formed with an arcuate document guide surface;

an accelerator wheel rotatably mounted on said base and having a periphery that is arranged to frictionally engage and drive a document along said guide surface;

a timing member rotatably supported on said base for rotation about an axis that is substantially coincident with respect to the axis of said accelerator wheel;

a register roll rotatably supported on the radially outer portion of said timing member and adapted to roll along said guide surface during a portion of its orbital movement with said timing member; and drive means for rotating said accelerator wheel and said timing member so that the effective speed of said accelerator wheel is greater than the effective oribital speed of said register roll, said register roll thereby temporarily slowing down an early document to a speed below the desired synchronized speed until the correct phase relation has been established and thereafter allowing said slowed document to be driven along said guide surface at said synchronized speed by the drive action of said accelerator wheel.

13. Apparatus as defined by claim 12: additionally comprising supplemental roll support means wherein said roll in addition to being supported on said timing member for rotation about the roll axis is also supported for slight movement towards and away from the radially inner portion of said member.

14. Apparatus as defined by claim 12 wherein a plurality of equally spaced register rolls are rotatably mounted on said timing member whereby more than one document may be synchronized for each revolution of said timing member.

References Cited by the Examiner
UNITED STATES PATENTS

| | | | |
|---|---|---|---|
| 2,248,079 | 7/41 | Harrold et al. | 271—46 |
| 2,634,126 | 4/53 | Williams | 271—46 |
| 2,977,114 | 3/61 | Hanson et al. | 271—32 |

ROBERT B. REEVES, *Acting Primary Examiner.*

RAPHAEL M. LUPO, SAMUEL F. COLEMAN, *Examiners.*